US012584887B2

(12) United States Patent
Kalariya et al.

(10) Patent No.: US 12,584,887 B2
(45) Date of Patent: Mar. 24, 2026

(54) SYSTEM AND METHOD FOR EVALUATING RESIDUAL LIFE OF COMPONENTS MADE OF COMPOSITE MATERIALS

(71) Applicant: Tata Consultancy Services Limited, Mumbai (IN)

(72) Inventors: Yagnik Pravinchandra Kalariya, Pune (IN); Abhijeet Gorey, Kolkata (IN); Amit Gangadhar Salvi, Pune (IN); Subhadeep Basu, Kolkata (IN); Supriya Gain, Kolkata (IN); Tapas Chakravarty, Kolkata (IN); Chirabrata Bhaumik, Kolkata (IN); Arpan Pal, Kolkata (IN); Sooriyan Senguttuvan, Pune (IN); Arijit Sinharay, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 787 days.

(21) Appl. No.: 17/934,187

(22) Filed: Sep. 21, 2022

(65) Prior Publication Data

US 2023/0095525 A1      Mar. 30, 2023

(30) Foreign Application Priority Data

Sep. 28, 2021    (IN) .............................. 202121044015

(51) Int. Cl.
*G01N 29/06*          (2006.01)
*G01N 29/04*          (2006.01)
(52) U.S. Cl.
CPC .......... *G01N 29/069* (2013.01); *G01N 29/043* (2013.01); *G01N 2291/0258* (2013.01)
(58) Field of Classification Search
CPC ............. G01N 29/4481; G01N 29/043; G01N 2291/0258; G01N 29/069
See application file for complete search history.

(56) References Cited

U.S. PATENT DOCUMENTS 11,403,446 B1 *    8/2022    Zhang ..................... G06F 30/23
2021/0208091 A1    7/2021    Villette et al.
(Continued)

FOREIGN PATENT DOCUMENTS

CN          113204923 A        8/2021

OTHER PUBLICATIONS

Shrifan, Nawah H. M. M., et al., "Prospect of Using Artificial Intelligence for Microwave Nondestructive Testing Technique: A Review", IEEE Access, vol. 7, pp. 110628-110650, Aug. 22, 2019 (Year: 2019).*

*Primary Examiner* — Jennifer Bahls
(74) *Attorney, Agent, or Firm* — Finnegan, Henderson, Farabow, Garrett & Dunner, LLP

(57)          ABSTRACT

This disclosure generally relates to the field of structural health monitoring, and, more particularly, to a method and system for evaluating residual life of components made of composite materials. Existing methods require performing computational methods such as Finite Element Analysis (FEA) on the results of Non-Destructive Testing (NDT) every time a component is inspected. This makes the process expensive and time-consuming. Thus, embodiments of present disclosure provide a method wherein NDT is performed using different sensing methods such as ultrasound, ultrasound pulse echo, thermography to determine type of defect, location of defect and depth of defect in a test component which are then fed into a pre-trained machine learning model to predict residual life of the component. Testing time is greatly reduced since the pre-trained machine learning model is trained offline using results of the computational methods.

6 Claims, 8 Drawing Sheets

(56) References Cited

U.S. PATENT DOCUMENTS

| | | | |
|---|---|---|---|
| 2022/0018811 A1* | 1/2022 | Al-Hashmy | .......... G01N 29/32 |
| 2022/0019190 A1 | 1/2022 | Mohamed Shibly et al. | |

\* cited by examiner

200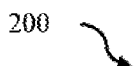

| Transmitting a plurality of ultrasound signals towards a test component comprising a defect, and receiving the plurality of ultrasound signals reflected by the test component | 202 |

| Extracting a plurality of features comprising time-frequency and statistical features from each of the plurality of received ultrasound signals | 204 |

| Determining type of the defect in the test component using a pre-trained classifier based on the plurality of features | 206 |

| Determining a location of the defect comprised in the test component based on time of flight analysis of the plurality of ultrasound signals | 208 |

| Scanning the location of the defect in the test component using a pulse echo ultrasound signal to determine depth of the defect | 210 |

| Scanning the location of the defect in the test component to estimate a dimension of the defect | 212 |

| Predicting residual life of the test component using a pre-trained machine learning model based on the type of the defect, the location of the defect, the depth of the defect and the dimension of the defect | 214 |

Component without defects

Ty    Ry                                        Defect l $d_1$

Component with a defect

Time (ms)

SYSTEM AND METHOD FOR EVALUATING RESIDUAL LIFE OF COMPONENTS MADE OF COMPOSITE MATERIALS

This U.S. patent application claims priority under 35 U.S.C. § 119 to: Indian Patent Application No. 202121044015, filed on Sep. 28, 2021. The entire contents of the aforementioned application are incorporated herein by reference.

TECHNICAL FIELD

The disclosure herein generally relates to the field of structural health monitoring, and, more particularly, to a method and system for evaluating residual life of components made of composite materials.

BACKGROUND

Composite materials are increasingly used in industries such as aerospace, transport, defense etc. for engineering structural applications. Any part or component made of composite materials can fail during its service life either due to manufacturing defects or due to damage caused by external loading or environment conditions. It essentially degrades the properties of composites materials thus affecting the residual life of the components. Structural health monitoring is a process to track the damages or defects during service life of structures comprising multiple components that accumulate damage gradually over a period of time and deteriorates the overall performance of the structures. It enables engineers to take critical decisions for repair or replacement of the components to avoid any further performance degradation and/or catastrophic failures. As a part of structural health monitoring process, various Non-Destructive Testing (NDT) methods are frequently conducted in a timely manner to evaluate residual life of the components. NDTs also help in checking for defects, if any, after the manufacturing process. The comprehensive understanding of the defects or damages during manufacturing and in service enables designing the next generation components.

Existing techniques of estimating residual life of the components by applying NDT methods require expert supervision and involves repetitive and frequent manual work of transferring NDT analysis results into a computational model such as Finite Element Analysis (FEA) model, Finite Element Method (FEM), Finite Differences etc. to compute allowable defects or damages through simulations. Some of the automated techniques of assessing the components require performing the computational methods on the results of NDT analysis each time the component is inspected. This makes the process expensive and time-consuming.

SUMMARY

Embodiments of the present disclosure present technological improvements as solutions to one or more of the above-mentioned technical problems recognized by the inventors in conventional systems. For example, in one embodiment, a method for evaluating residual life of components made of composite materials is provided. The method includes transmitting a plurality of ultrasound signals towards a test component comprising a defect and receiving the plurality of ultrasound signals reflected by the test component. Further, a plurality of features comprising time-frequency and statistical features are extracted from each of the plurality of received ultrasound signals. Further, type of the defect in the test component is determined using a pre-trained classifier based on the plurality of features and a location of the defect comprised in the test component is determined based on time of flight analysis of the plurality of ultrasound signals. Further, the location of the defect in the test component is scanned using a pulse echo ultrasound signal to determine depth of the defect comprised in the test component. Furthermore, the location of the defect in the test component is scanned by a thermal camera to estimate a dimension of the defect and residual life of the test component is predicted using a pre-trained machine learning model based on the type of the defect, the location of the defect, the depth of the defect and the dimension of the defect.

In another aspect, a system for evaluating residual life of components made of composite materials is provided. The system includes a memory storing instructions; one or more communication interfaces; an ultrasound sensor; a pulse echo ultrasound sensor; a thermal camera and one or more hardware processors coupled to the memory via the one or more communication interfaces, wherein the one or more hardware processors are configured by the instructions to: transmit, via the ultrasound sensor, a plurality of ultrasound signals towards a test component comprising a defect and receiving the plurality of ultrasound signals reflected by the test component. Further, the one or more hardware processors are configured to extract a plurality of features comprising time-frequency and statistical features from each of the plurality of received ultrasound signals and determine type of the defect in the test component using a pre-trained classifier based on the plurality of features. Furthermore, the one or more hardware processors are configured to determine a location of the defect comprised in the test component based on time of flight analysis of the plurality of ultrasound signals; scan, via the pulse echo ultrasound sensor, the location of the defect in the test component using a pulse echo ultrasound signal to determine depth of the defect; scan, via the thermal camera, the location of the defect in the test component to estimate a dimension of the defect; and predict residual life of the test component using a pre-trained machine learning model based on the type of the defect, the location of the defect, the depth of the defect and the dimension of the defect.

In yet another aspect, there are provided one or more non-transitory machine-readable information storage mediums comprising one or more instructions which when executed by one or more hardware processors cause a method for material property prediction using element specific neural networks. The method includes transmitting a plurality of ultrasound signals towards a test component comprising a defect and receiving the plurality of ultrasound signals reflected by the test component. Further, a plurality of features comprising time-frequency and statistical features are extracted from the plurality of received ultrasound signals. Further, type of the defect in the test component is determined using a pre-trained classifier based on the plurality of features and a location of the defect comprised in the test component is determined based on time of flight analysis of the ultrasound signal. Further, the location of the defect in the test component is scanned using a pulse echo ultrasound signal to determine depth of the defect comprised in the test component. Furthermore, the location of the defect in the test component is scanned by a thermal camera to estimate a dimension of the defect and residual life of the test component is predicted using a pre-trained machine learning model based on the type of the defect, the location of the defect, the depth of the defect and the dimension of the defect.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flowchart illustrating method of evaluating residual life of components made of composite materials, according to some embodiments of the present disclosure.

DETAILED DESCRIPTION

Figure 1:
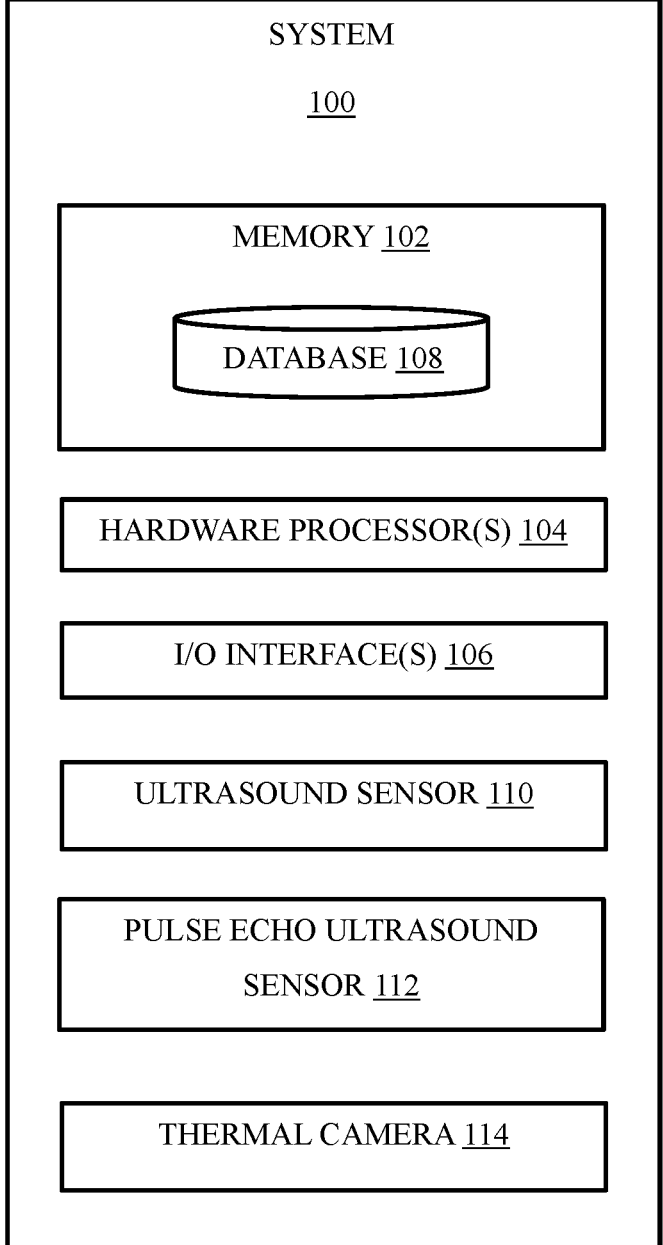
FIG. 1 illustrates an exemplary system for evaluating residual life of components made of composite materials, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments of the present disclosure provide a method and system for evaluating residual life of components made of composite materials. Existing methods require performing Non-Destructive Testing (NDT) on each of the components of a structure and further processing of results of NDT using computational methods such as Finite Element Analysis (FEA), Finite Element Method (FEM) etc. The computational methods are time consuming which increases overall time taken for determining residual life of the components. In order to overcome this challenge, embodiments of present disclosure employ machine learning to reduce the time taken for analysis. In the method disclosed, initially a plurality of ultrasound signals are transmitted towards a test component comprising a defect and the plurality of ultrasound signals reflected by the test component is received. Further, a plurality of features are extracted from the plurality of received ultrasound signals and type of the defect in the test component is determined using a pre-trained classifier based on the plurality of features. Further, a location of the defect comprised in the test component is determined based on time of flight analysis of the ultrasound signal and the location of the defect in the test component is scanned using a pulse echo ultrasound signal to determine depth of the defect comprised in the test component. Furthermore, the location of the defect in the test component is scanned by a thermal camera to estimate a dimension of the defect and residual life of the test component is predicted using a pre-trained machine learning model based on the type of the defect, the location of the defect, the depth of the defect and the dimension of the defect. Thus, the method eliminates the need of processing NDT and Finite Element Method (FEM) results repetitively during real time inspection of the component thereby making the decision faster, scalable, and efficient. Also, the method is fully automatic and reduces dependence on human experts. In addition, since the pre-trained classifier and ML model can be embedded in computer chips, the approach can lead to portable instruments for on-spot near real time estimation of residual life.

Referring now to the drawings, and more particularly to FIG. 1 through 9, where similar reference characters denote corresponding features consistently throughout the figures, there are shown preferred embodiments and these embodiments are described in the context of the following exemplary system and/or method.

FIG. 1 illustrates an exemplary system 100 for evaluating residual life of components made of composite materials, according to some embodiments of the present disclosure. In an embodiment, the system 100 includes one or more processors 104, communication interface device(s) or Input/Output (I/O) interface(s) 106, one or more data storage devices or memory 102, an ultrasound sensor 110, a pulse echo ultrasound sensor 112, and a thermal camera 114 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the one or more processors 104 comprises a controller and an analysis unit. The controller actuates the ultrasound sensor 110, the pulse echo ultrasound sensor 112, the thermal camera 114 and a Data Acquisition unit (DAQ). Further it controls when Machine Learning (ML) driven analysis need to run and when the computed result need to be displayed on the I/O interface device(s) 106. The DAQ is used to capture analog response of the ultrasound sensor, the pulse echo ultrasound sensor, and the thermal camera in digital form and store it in memory 102 so that it can be processed by the one or more hardware processors 104. The analysis unit implements the pre-trained classifier and the pre-trained machine learning model along with required data and signal processing using the hardware processors 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. In an embodiment, the I/O interface device(s) 106 display the defect parameters (for example, defect type, defect location and defect depth) and estimated residual life.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The database 108 may store information but are not limited to, information associated with at least one of: (i) material parameters of the components, (ii) the pre-trained classifier, (iii) the pre-trained machine learning model, (iv) the defect parameters (defect location, defect type, defect depth, defect dimension) of the components and so on. Further, the database 108 stores information pertaining to inputs fed to the system 100 and/or outputs generated by the system (e.g., at each stage), specific to the methodology described herein.

Functions of the components of system 100 are explained in conjunction with diagrams depicted in FIGS. 2 through 9 for evaluating residual life of components made of composite materials. In an embodiment, the system 100 comprises one or more data storage devices or the memory 102 operatively coupled to the processor(s) 104 and is configured to store instructions for execution of steps of the method depicted in FIG. 2 by the processor(s) or one or more hardware processors 104. The steps of the method of the present disclosure will now be explained with reference to the components or blocks of the system 100 as depicted in FIG. 1, the steps of flow diagrams as depicted in FIG. 2, the block diagrams of FIGS. 3, 4A and 4B and experimental results illustrated in FIGS. 5 to 9. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3:
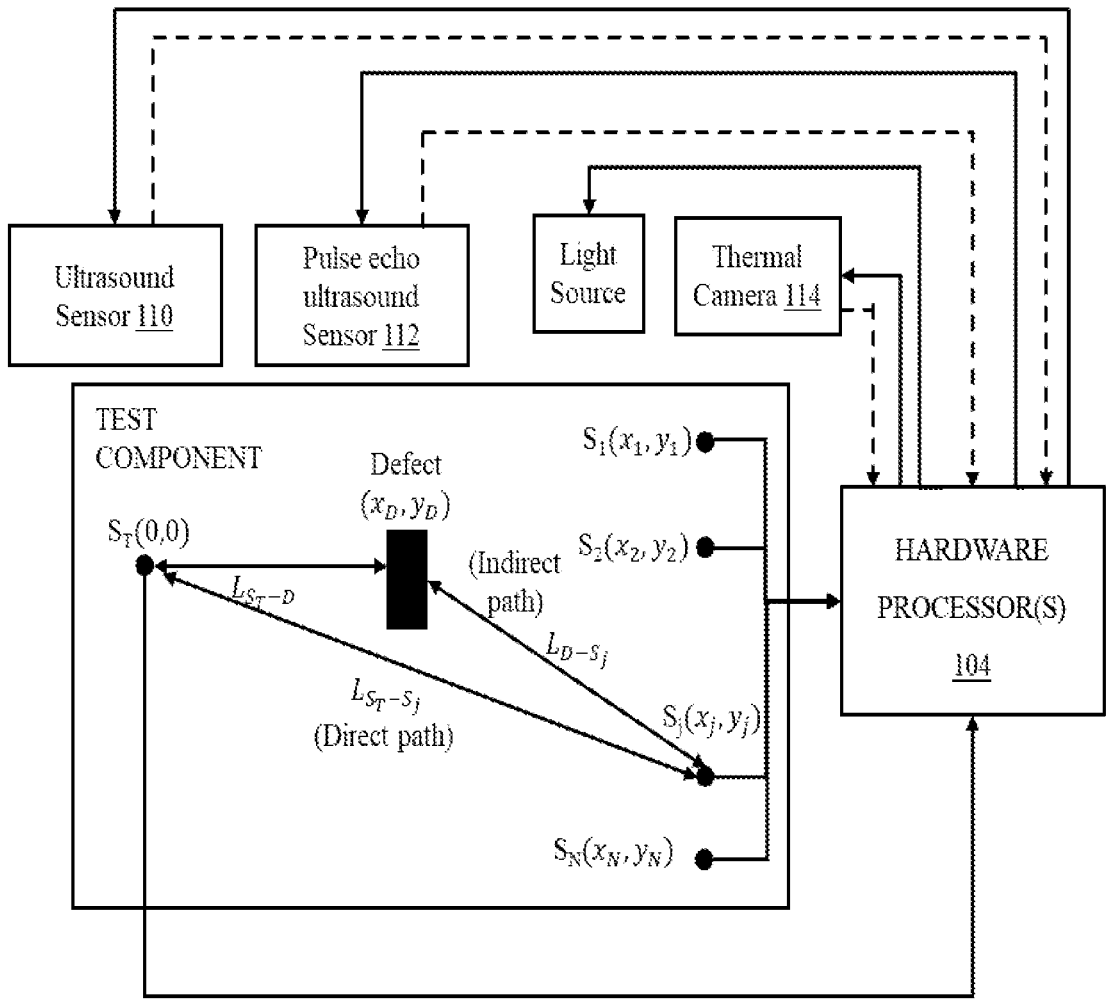
FIG. 3 is a block diagram illustrating an experimental setup of system illustrated in FIG. 1 to perform the method illustrated in FIG. 2 on a test component, according to some embodiments of the present disclosure.

FIG. 2 is a flowchart illustrating method 200 for evaluating residual life of components made of composite materials, according to some embodiments of the present disclosure. At step 202 of the method 200, a plurality of ultrasound signals are transmitted towards a test component, for example, sample, sheet, part, and the like, which comprises a defect such as damage, fault, flaw, scratch, crack, and the like, by the ultrasound sensor 110 controlled by the one or more hardware processors 104. The ultrasound sensor 110 comprises a transmitter ($S_T$) and one or more receivers ($S_1$, $S_2$, ..., $S_j$, ... $S_N$) placed on the test component at locations $S_T(0,0)$, $S_1(x_1,y_1)$, $S_2(x_2,y_2)$, ..., $S_j(x_j,y_j)$, ..., $S_N(x_N,y_N)$ respectively as illustrated in FIG. 3. In an embodiment, each of the plurality of ultrasound signals is transmitted as a tone burst of 5 cycles with 150 kHz by the transmitter. In another embodiment, the transmitter transmits each of the plurality of ultrasound signals with a frequency sweep (100 kHz to 1 MHz) of 100 Hz frequency step size. The plurality of ultrasound signals are reflected or scattered by the test component which is received by the one or more receivers of the ultrasound sensor 110. Further, at step 204 of the method 200, the one or more hardware processors 104 are configured to extract a plurality of features comprising time-frequency and statistical features from the plurality of received ultrasound signals. From the reflected tone burst ultrasound signals, box-pierce statistic of Discrete Wavelet Transform (DWT), mean of windowed box-pierce statistic of DWT, Hjorth complexity time-domain and standard deviation of windowed box-pierce stat of DWT features are extracted. In another embodiment when the ultrasound signals are transmitted as a frequency sweep, Root Mean Square (RMS) value of the reflected signals are computed for each excitation frequency of the frequency sweep. After a complete sweep, resonance spectrum is generated by plotting excitation frequency vs corresponding RMS values. From the plot, a plurality of features comprising resonance peak locations, amplitude of resonance peaks, width of resonance peaks and adjacent resonance peak to peak distance are extracted. Different time-frequency and statistical features maybe used in alternate embodiments.

x(n) represents a reflected ultrasound signal among the plurality of reflected ultrasound signals for an ultrasound signal among the plurality of ultrasound signals transmitted as tone burst. It is passed through a low pass filter with impulse response g to perform DWT of the reflected ultrasound signal. Equation 1 gives output of the DWT p(n), wherein * is the convolution. Equation 2 gives the box-pierce statistic calculation, wherein $\rho_{a,k}^2$ is the auto-correlation co-efficient at lag k of residual $\hat{a}_t$, n is the number of terms in the x(n) and K is the maximum lag considered. For output of the DWT, $\rho_{a,k}^2$ is given by equation 3 and hence the box-pierce statistic of DWT is calculated by equation 4.

$$p(n)=(x*g)(n) \tag{1}$$

$$BP(k)=n\Sigma_{k=1}^{K}\rho_{a,k}^2 \tag{2}$$

$$\rho_k^2=\Sigma_{n=-\infty}^{\infty}p(n)p(n-k) \tag{3}$$

$$BP(k)=n\Sigma_{k=1}^{K}\rho_{a,k}^2=n\Sigma_{k=1}^{K}\Sigma_{n=-\infty}^{\infty}p(n)p(n-k) \tag{4}$$

To calculate mean of windowed box-pierce statistic of DWT, firstly hanning window w(n) is determined by equation 5. Then, windowed signal ($w_{signal}$) is determined by equation 6 and finally mean of windowed box-pierce statistic of DWT is calculated by equation 7.

$$w(n) = 0.5\left(1 - \cos\left(2\pi\frac{n}{N}\right)\right); 0 \le n \le N \tag{5}$$

$$w_{signal} = w(n)BP(k), \text{ wherein } BP(k) \text{ is determined by equation 4} \tag{6}$$

$$\mu = \frac{1}{N}\sum_{n=0}^{N-1} w(n)BP(k) = \frac{1}{N}\sum_{n=0}^{N-1} w(n)n\sum_{k=1}^{K}\sum_{n=-\infty}^{\infty} p(n)p(n-k) \tag{7}$$

Standard deviation of windowed box-pierce statistic of DWT is calculated by equation 8, wherein w(n) is the windowed signal ($w_{signal}$) determined by equation 6 and BP(k) is determined by equation 4.

$$\sigma = \sqrt{\frac{1}{N-1}\sum_{n=1}^{N}(w(n)BP(k)-\mu)^2} = \tag{8}$$

$$\sqrt{\frac{1}{N-1}\sum_{n=1}^{N}\left(\left(w(n)n\sum_{k=1}^{K}\sum_{n=-\infty}^{\infty}p(n)p(n-k)\right)-\mu\right)^2}$$

Hjorth parameters are statistical properties used in signal processing in the time domain introduced by Bo Hjorth in 1970. The parameters are activity, mobility, and complexity. The Hjorth complexity parameter represents the change in frequency and is given by equation 8. It compares the signal's similarity to a pure sine wave, where the value converges to 1 if the signal is more similar.

$$\text{Complexity} = \frac{\text{Mobility}(x(n)-x(n-1))}{\text{Mobility}(x(n))}, \tag{9}$$

wherein $x(n)$is the ultrasound signal

Once the plurality of features are extracted, at step 206 of the method 200, one or more hardware processors 104 are configured to determine type of the defect in the test component using a pre-trained classifier based on the plurality of features. In an embodiment, the pre-trained classifier is ensemble adaptive boost classifier. Different classifiers maybe used in alternate embodiments. The pre-trained classifier is trained by first performing ultrasound test on a component without defect and a plurality of components with known defects, wherein the ultrasound test comprises transmitting a plurality of ultrasound signals to the component and recording the ultrasound signals reflected or scattered by the component. Then, the plurality of features are extracted from the results of the ultrasound test, and they are correlated with the known defects of the plurality of components. Finally, the classifier is trained using the plurality of features and corresponding defects.

Once the type of defect in the test component is determined, at step 208 of the method 200, one or more hardware processors are configured to determine a location of the defect comprised in the test component based on time of flight analysis of each of the plurality of ultrasound signals. As understood by a person skilled in the art, time of flight of the ultrasound signal is the time taken by the ultrasound signal to travel a certain distance through the test component. Calculations for one ultrasound signal among the plurality of ultrasound signals is explained herein. The location of the defect can be accurately determined by performing these calculations for the plurality of ultrasound signals in a similar way. Suppose V is the velocity of the ultrasound signal in the test component. The value of V can be calculated by using one transmitter and one receiver. For example, consider ultrasonic tone burst signal (5 cycle tone burst with frequency 150 kHz) is applied on a component without any defects (undamaged component) by a transmitter (S$_T$) and the ultrasound signal reflected by the component is captured by a receiver placed at a known distance d. Suppose in the undamaged component, the signal is received by the receiver at time t, then, V is calculated according to the equation 10.

$$V = \frac{d}{t} \tag{10}$$

Now, consider scenario illustrated in FIG. 3 wherein there is a single transmitter and multiple receivers on the test component. Suppose the transmitter is transmitting ultrasonic tone burst (5 cycle tone burst with 150 KHz frequency). After hitting the defect, the ultrasound signal is reflected which is then detected at the plurality of receivers (S$_1$, S$_2$, . . . , S$_N$). The ultrasound signal can travel in two ways to the receiver: (i) direct path from transmitter to receiver (shown as L$_{S_T-S_j}$ in FIG. 3) and (ii) indirect path from transmitter to the defect (L$_{S_T-D}$) and from the defect to the receiver (L$_{D-S_j}$). Suppose the signal travelling the direct path reaches a receiver S$_j$ at time t$_j$ and the signal travelling the indirect path reaches at time t$_{j+T}$. Then, time difference of occurring between two consecutive received signals is computed by equation 11. It can be theoretically expressed as equation 12, wherein L$_{S_T-D}$ is distance between transmitter of the ultrasound sensor and the defect and is calculated by equation 13, V is velocity of the ultrasound signal, L$_{D-S_j}$ is distance between the defect and a receiver (j), among one or more receivers of the ultrasound sensor, calculated by equation 14, L$_{S_T-S_j}$ is distance between the transmitter and the receiver (j) which is calculated by equation 15, and $\Delta t_{T-j}$ is difference in time of flight of the ultrasound signal travelled via the direct path and the indirect path from the transmitter to the receiver.

$$t_{j+T} - t_j = \Delta t_{T-j} \tag{11}$$

$$\left(\frac{L_{S_T-D}}{V} + \frac{L_{D-S_j}}{V}\right) - \frac{L_{S_T-S_j}}{V} = \Delta t_{T-j}, \text{ where } j \in \{1, 2, \dots n\} \tag{12}$$

$$L_{S_T-D} = \sqrt{x_D^2 + y_D^2} \text{ wherein}(x_D, y_D)\text{is the location of the defect} \tag{13}$$

$$L_{D-S_j} = \sqrt{(x_D - x_j)^2 + (y_D - y_j)^2} \text{ wherein}(x_j, y_j)\text{is coordinates of } S_j \tag{14}$$

$$L_{S_T-S_j} = \sqrt{x_j^2 + y_j^2} \tag{15}$$

Equations 13, 14 and 15 are substituted in equation 12 to get equation 16 from which equation 17 is obtained by rearranging the terms. Theoretically, the equation 17 represents an ellipse indicating possible location of defect. It can be alternately written as equation 18. Similar equations for all the one or more receivers (say, N receivers) of the ultrasound sensor is derived. Now, (x$_D$,y$_D$) can be estimated by minimizing an objective function J as given by equation 19 to determine exact location of defect (x$_D$,y$_D$).

$$\frac{\sqrt{x_D^2 + y_D^2}}{V} + \frac{\sqrt{(x_D - x_j)^2 + (y_D - y_j)^2}}{V} - \frac{L_{S_T-S_j}}{V} = \Delta t_{T-j} \tag{16}$$

$$\frac{\sqrt{x_D^2 + y_D^2}}{V} + \frac{\sqrt{(x_D - x_j)^2 + (y_D - y_j)^2}}{V} - \frac{L_{S_T-S_j}}{V} - \Delta t_{T-j} = 0 \tag{17}$$

$$f(j) = 0, \text{ wherein } f(j) = \tag{18}$$

$$\frac{\sqrt{x_D^2 + y_D^2}}{V} + \frac{\sqrt{(x_D - x_j)^2 + (y_D - y_j)^2}}{V} - \frac{L_{S_T-S_j}}{V} + \Delta t_{T-j}$$

$$\text{minimize } J = \sum_{j=1}^{N} f(j)^2 \tag{19}$$

$$\text{argmin: } x_D, y_D$$

Figure 4A:
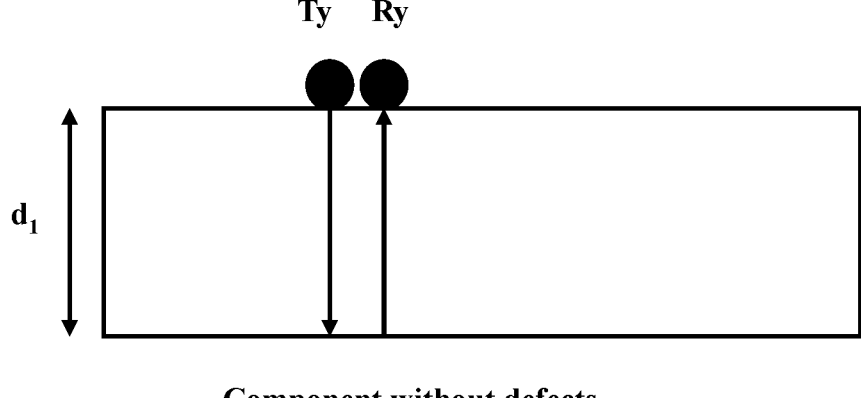
FIGS. 4A and 4B illustrate scanning of a component without defects and a component with defects, respectively, using a pulse echo ultrasound signal, according to some embodiments of the present disclosure.
Figure 4B:
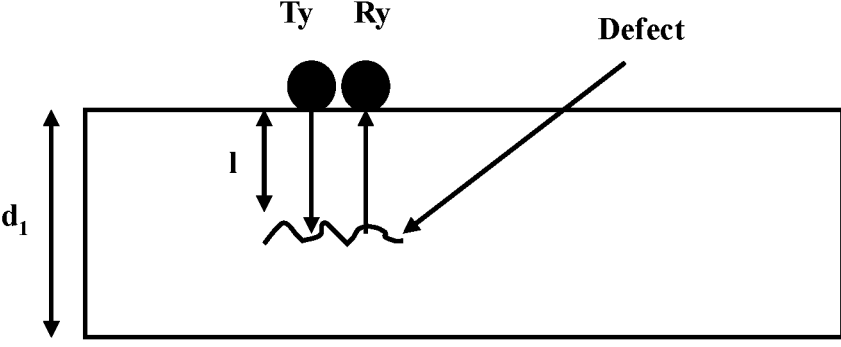

Once the location of the defect comprised in the test component is determined, one or more hardware processors 104 are configured to scan, via the pulse echo ultrasound sensor 112, the location of the defect in the test component using a pulse echo ultrasound signal to determine depth of the defect. The pulse echo ultrasound sensor 112 comprises a transmitter $T_y$ and a receiver $R_y$ and is placed near the test component as illustrated in FIGS. 3, 4A and 4B. A pulse is sent by the transmitter and the reflected pulse is recorded by the receiver. The travel time of the pulse is calculated from the difference of pulse transmission time instant, and pulse received time instant. Speed of sound (v) in the component is known a prior. If there is no defect in the component then the pulse will travel the full depth ($d_1$) as show in FIG. 4A. Then, the travel time of the pulse ($T_{normal}$) is calculated by equation 20. If there is a defect in the component (for example, the test component) then the pulse will be returned from the defect itself as shown in FIG. 4B. Suppose the defect is formed l units below the top surface (i.e. depth of defect formation is l), then the travel time T of the received pulse is given by equation 23. By measuring the travel time T and using known value of v, the equation 21 can be solved to determine the value of depth l as in equation 22.

$$T_{normal} = 2 * \frac{d_1}{v} \qquad (20)$$

$$T = 2 * \frac{l}{v} \qquad (21)$$

$$l = T * \frac{v}{2} \qquad (22)$$

In another embodiment, a predefined area ($\Delta x_d$ and $\Delta y_d$) around the location of the defect ($x_D, y_D$) is scanned by the pulse-echo sensor. The number of scan points (n) can be predefined. Following equation 22, each scan point (say $i^{th}$ point) provides a travel time (say $T_i$) corresponding to defect depth of $l_i$. If ($T_{normal} - T_i$)>predefined threshold, then the depth $l_i$ is computed for that $T_i$ by equation 23. Suppose among n scan points there are m scan points where ($T_{normal} - T_i$)>pre-defined threshold is true, then all such $l_i$'s are averaged and the average value l_avg is the depth of the defect (as per equation 24).

$$l_i = T_i * \frac{v}{2} \qquad (23)$$

$$l\_avg = \frac{1}{m} * \sum_{i=1}^{m} l_i \qquad (24)$$

Once the depth of the defect is determined, at step 212 of the method 200, one or more hardware processors 104 is configured to scan, via the thermal camera 114, the location of the defect in the test component to estimate a dimension of the defect. The thermographic scan image is created which is centered at the location of defect ($x_D, y_D$). Image processing techniques are applied on the thermographic scan image to calculate the length and breadth of that image which in turn gives dimension of the defect. For example, a Lock-In thermography technique is used to determine the dimension of the defect. Once the dimension of the defect is determined, at step 214 of the method 200, one or more hardware processors is configured to predict residual life of the test component using a pre-trained machine learning model based on the type of the defect, the location of the defect, the depth of the defect and the dimension of the defect. The pre-trained machine learning model is trained by first obtaining residual properties of a plurality of components with known defects, wherein the residual properties comprise stiffness, load bearing capacity etc. Next, residual life of each of the plurality of components is determined using a material degradation mechanism and a computational method based on the defect in the component, one or more predefined loading conditions, and material properties of the component. For example, the material degradation mechanism is fatigue and the computational method used is Finite Element Method (FEM). Finally, the machine learning model is trained using the residual life of the plurality of components, features of defects in the plurality of components for the one or more predefined loading conditions and the material properties of the plurality of components, wherein the features of defects comprise type of the defect, location of the defect, depth of the defect and dimension of the defect. The computational methods take a lot of time for execution and hence affects the calculation of residual life while assessing a test component. Thus, by using a machine learning model trained by results of the computational method for different materials and features of defects for different degradation mechanisms, the time taken to assess a component will be reduced. This greatly improves the efficiency when large number of components are assessed on daily basis in industries such as aircraft or automobiles.

Use Case Example and Experimental Analysis

The experiments are conducted using a test component (of size 460 mm×305 mm×2 mm) and investigated for a crack as defect. The test component is made of G10/FR-4 composite material having short glass fibers (~10% volume fraction) in epoxy resin. FR-4 indicates Flame Retardant grade 4. This composite material is widely used as an insulator for electrical and electronic applications. It is also used for mechanical applications when outstanding strength, stiffness, and excellent creep resistance are required. Few properties of G10/FR4 material is listed in Table 1.

TABLE 1

| Property | Value |
| --- | --- |
| Density | 1.8 g/cm$^3$ |
| Tensile Strength | 262 MPa |
| Compressive Strength | 448 MPa |
| Young's Modulus | 16.5 GPa |

Figure 5:
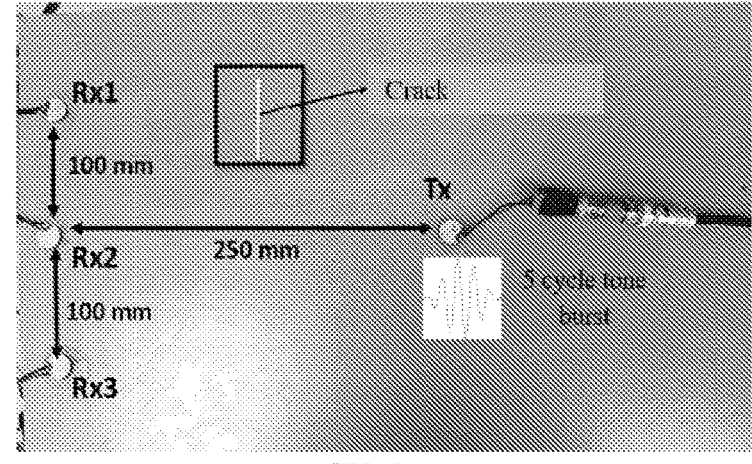
FIG. 5 is a block diagram illustrating an example experimental setup to perform the method illustrated in FIG. 2 on a test component with a crack, according to some embodiments of the present disclosure.
Figure 6A:
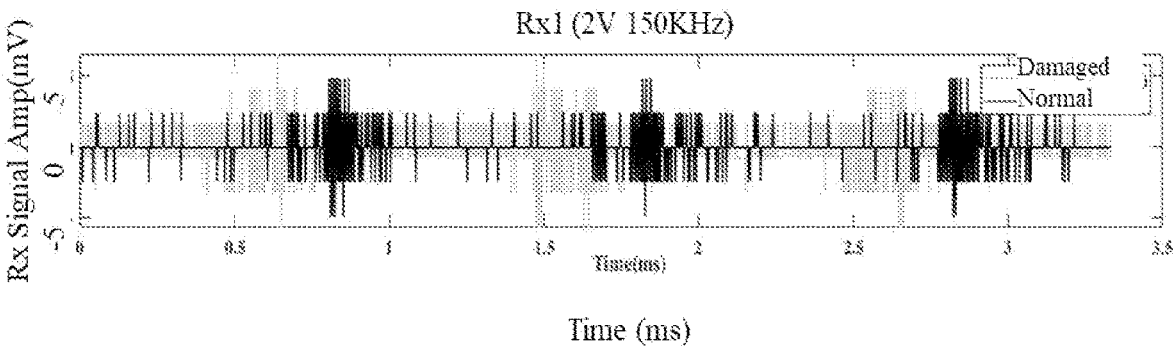
FIGS. 6A, 6B and 6C illustrate ultrasound signal received at Rx1, Rx2 and Rx3, respectively, of the example experimental setup illustrated in FIG. 5, according to some embodiments of the present disclosure.
Figure 6B:
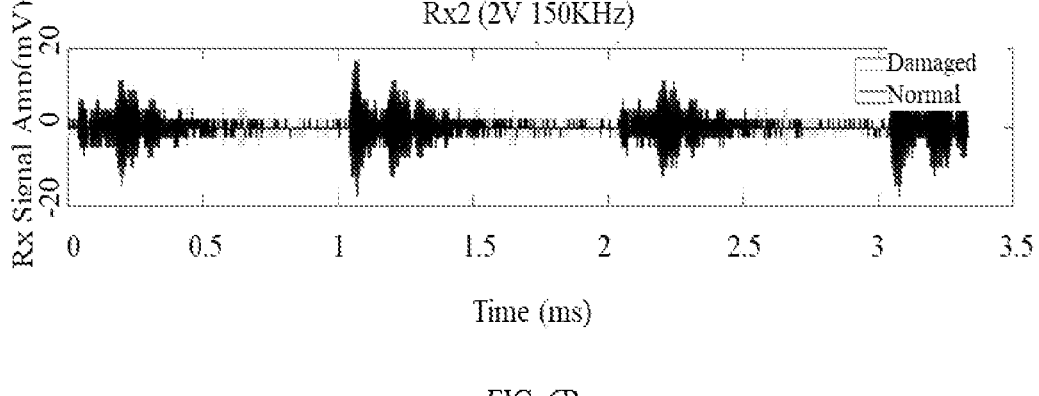
Figure 6C:
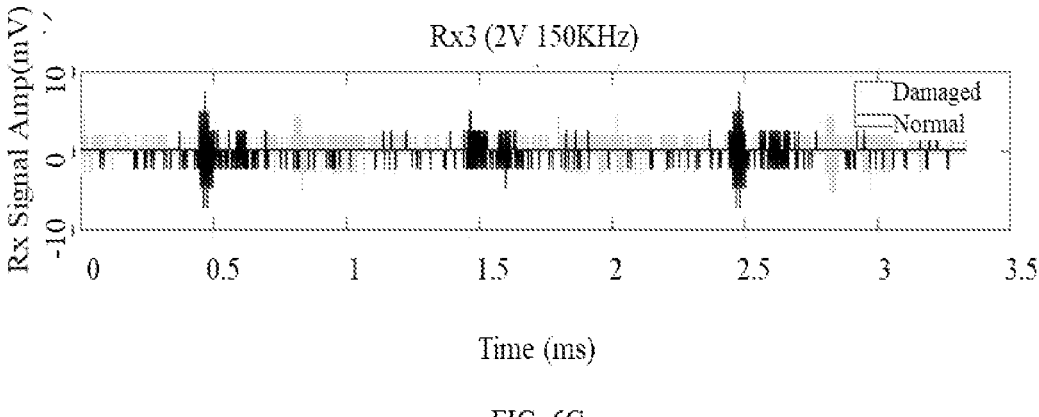

The experimental setup is illustrated in FIG. 5. An ultrasound signal having 5 cycle tone burst with 150 kHz frequency is transmitted by the transmitter (Tx) which is reflected by the test component. The reflected signal is received by the receivers Rx1, Rx2 and Rx3 which is illustrated in FIGS. 6A, 6B and 6C respectively. The plurality of features are extracted from the reflected signals and fed into a trained adaptive boost classifier. It classifies the normal (component without defects or undamaged sample) and cracked sheet (test component) with 80% accuracy. The location and dimension of the defect is identified by visual inspection during the experiments. Then, residual life of the test component is predicted using the pre-trained machine learning model based on the type of the defect, the location of the defect, the depth of the defect and the dimension of the defect.

Figure 7:
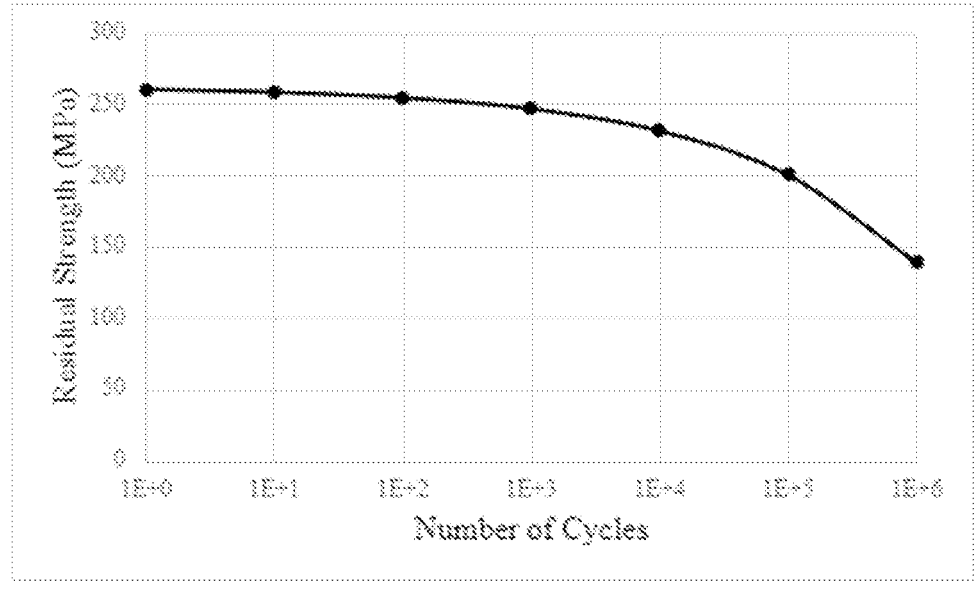
FIG. 7 illustrates strength degradation mechanism based on fatigue loading, according to some embodiments of the present disclosure.

For training of the pre-trained machine learning model, fatigue as a degradation mechanism is chosen, wherein only strength of the material is degraded. Degradation of polymer matrix or reinforcement in composite materials can occur due to temperature, humidity, radiation, chemical or biological processes/attacks, creep, fatigue, etc. Characterization of material degradation is quite dependent on physical experiments. Once phenomenological or empirical model is derived from the experimental characterization, it can be used for modeling the material degradation in analytical or computational models for performance evaluation of the components during service life. The degradation mechanism in the current use case example is mathematically represented by equation 25, wherein σ(N) is residual strength after N number of cycles. $\sigma_{ULT}$ is ultimate strength, $\sigma_{max}$ is maximum fatigue stress applied and $N_f$ is the fatigue life at applied maximum fatigue stress and stress ratio R. The stress ratio is defined as the ratio of applied minimum stress to applied maximum stress. v is strength degradation parameter which is determined or derived from physical experiments. The results of applying fatigue degradation mechanism is illustrated in FIG. 7.

$$\sigma(N) = \sigma_{ULT} - (\sigma_{ULT} - \sigma_{max})\left(\frac{N}{N_f}\right)^v \qquad (25)$$

Figure 8:
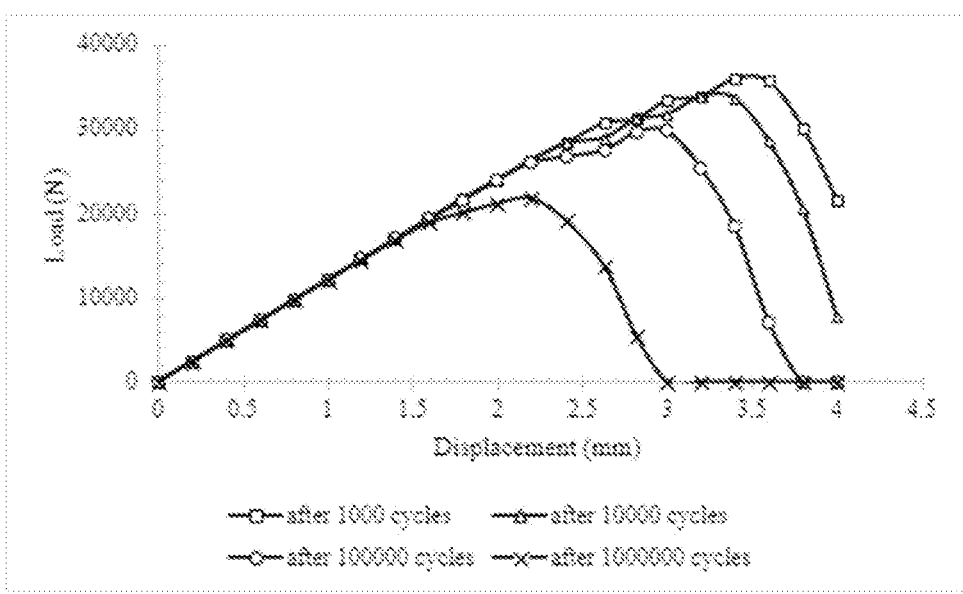
FIG. 8 illustrates predicted load-displacement profiles at a plurality of cycles after damage detection, according to some embodiments of the present disclosure.
Figure 9:
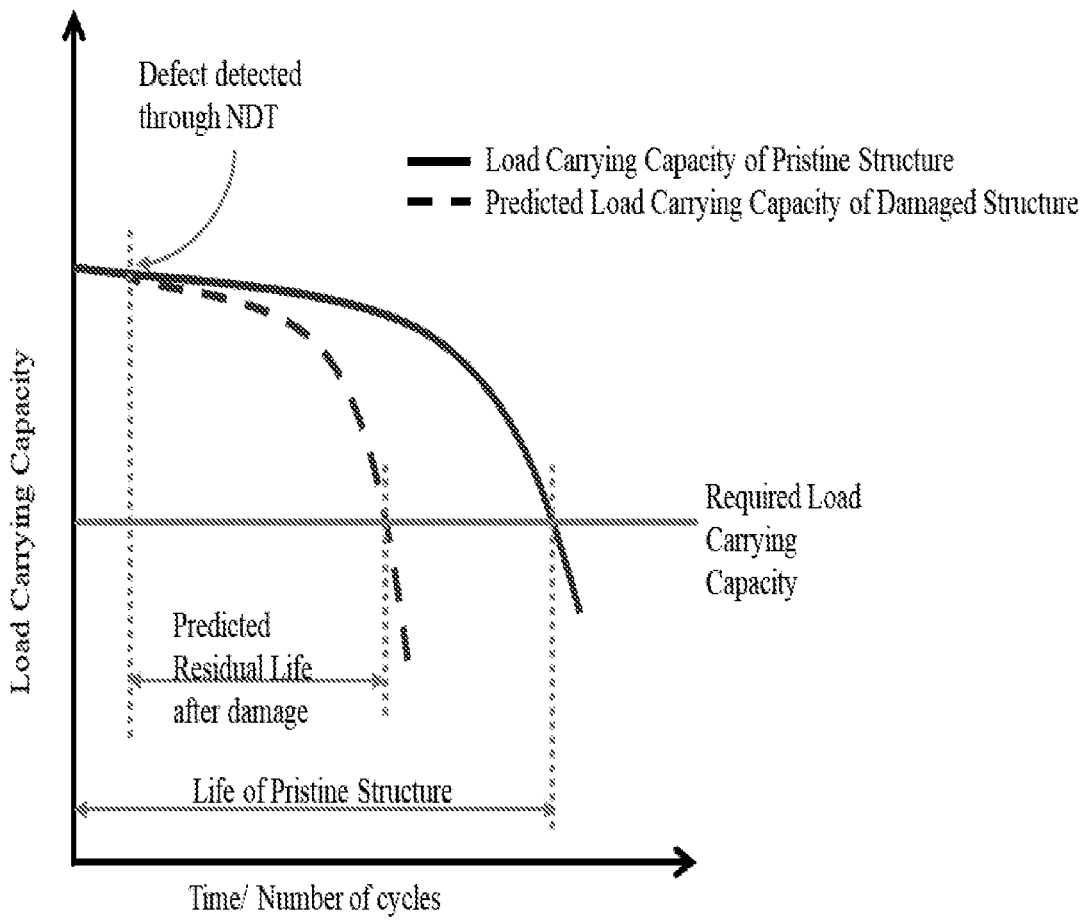
FIG. 9 illustrates residual life prediction based on a load carrying capacity, according to some embodiments of the present disclosure.

FEA is performed at a plurality of time steps by static structural analysis with element removal method, wherein any element with stress value going above residual strength is removed from the analysis in next timestep. The strength degradation is included in the FEA model. Instead of conducting analysis at each fatigue cycle, it is conducted at the interval of 1000 cycles. The fatigue loading is also replaced with maximum applied load. The element removal method is used to remove the elements having stress greater than instantaneous material strength. All these features save the simulation time with minimal loss of accuracy in prediction of load carrying capacity. The analysis is displacement controlled and load-displacement profile is extracted from analysis. The load carrying or bearing capacity and corresponding displacement is obtained from the load-displacement profile. Once the defect is detected through steps 202-212 of the method 200, corresponding defected volume is removed in the test component and analysis is conducted again to obtain revised trend/evolution of load carrying capacity which is illustrated in FIG. 8. The load carrying capacity of the test component decreases over time due to degradation of material. The trend gets accelerated once the damage or any defect is induced in structure as illustrated in FIG. 9. Once this revised trend of load carrying capacity is obtained from FEM, the residual life is calculated for given structure and defect type, size, and location. This data is then used to train the machine learning model along with defect type, defect location, defect depth and material properties to predict residual life of the component. The current machine learning model has 83% accuracy.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

transmitting, via an ultrasound sensor controlled by one or more hardware processors, a plurality of ultrasound signals towards a test component comprising a defect, and receiving the plurality of ultrasound signals reflected by the test component;

extracting, via the one or more hardware processors, a plurality of features comprising time-frequency and statistical features from each of the plurality of received ultrasound signals;

determining, via the one or more hardware processors, type of the defect in the test component using a pre-trained classifier based on the plurality of features, wherein training of the pre-trained classifier comprises:

performing ultrasound test on a component without defect and a plurality of components with known defects, wherein the ultrasound test comprises transmitting a plurality of ultrasound signals to the component and recording the plurality of ultrasound signals reflected by the component;

extracting a plurality of features from the results of the ultrasound test;

correlating the plurality of features with the known defects of the plurality of components; and training the classifier using the plurality of features and corresponding defects;

determining, via the one or more hardware processors, a location of the defect comprised in the test component based on time of flight analysis of the plurality of ultrasound signals, wherein the time of flight of the ultrasound signal is time taken by the ultrasound signal to travel a certain distance through the test component, wherein the location of the defect is determined by minimizing an objective function $J = \Sigma_{j-1}^{N} f(j)^2$, wherein $$f(j) = \left( \frac{L_{S_T-D}}{V} + \frac{L_{D-S_j}}{V} \right) - \frac{L_{S_T-S_j}}{V} - \Delta t_{T-j} = 0,$$

wherein $L_{S_T-D}$ is distance between transmitter of the ultrasound sensor and the defect which is calculated as $\sqrt{x_D^2 + y_D^2}$ wherein $(x_D, y_D)$ is the location of the defect, V is velocity of an ultrasound signal among the plurality of ultrasound signals, $L_{D-S_j}$ is distance between the defect and a receiver (j) among one or more receivers of the ultrasound sensor which is calculated as $\sqrt{(x_D-x_j)^2 + (y_D-y_j)^2}$ wherein $(x_j, y_j)$ is location of the receiver (j), $L_{S_T-S_j}$ is distance between the transmitter and the receiver (j) which is calculated as $\sqrt{x_j^2 + y_j^2}$, and $\Delta t_{T-j}$ is difference in time of flight of the ultrasound signal travelled via a direct path and an indirect path from the transmitter to the receiver;

scanning, via a pulse echo ultrasound sensor controlled by the one or more hardware processors, the location of the defect in the test component using a pulse echo ultrasound signal to determine depth of the defect;

scanning, via a thermal camera controlled by the one or more hardware processors, the location of the defect in the test component to estimate a dimension of the defect; and predicting, via the one or more hardware processors, residual life of the test component using a pre-trained machine learning model based on the type of the defect, the location of the defect, the depth of the defect and the dimension of the defect, wherein training of the pre-trained machine learning model comprises:

obtaining residual properties of a plurality of components with known defects, wherein the residual properties comprise stiffness and load bearing capacity;

determining residual life of each of the plurality of components using a material degradation mechanism and a computational method based on the defect in the component, one or more predefined loading conditions, and material properties of the component; and training a machine learning model to generate the pre-trained machine learning model using the residual life of the plurality of components, features of defects in the plurality of components for the one or more predefined loading conditions and the material properties of the plurality of components, wherein the features of defects comprise type of the defect, location of the defect, depth of the defect and dimension of the defect.

2. The method of claim 1, wherein the plurality of features comprises box-pierce statistic of Discrete Wavelet Transform (DWT), mean of windowed box-pierce statistic of DWT, Hjorth complexity time-domain and standard deviation of windowed box-pierce stat of DWT, resonance peak locations, amplitude of resonance peaks, width of resonance peaks and adjacent resonance peak to peak distance, wherein the pre-trained classifier is ensemble adaptive boost classifier.

3. A system comprising:

a memory storing instructions;

one or more communication interfaces;

an ultrasound sensor;

a pulse echo ultrasound sensor;

a thermal camera; and one or more hardware processors coupled to the memory via the one or more communication interfaces, wherein the one or more hardware processors are configured by the instructions to:

transmit, via the ultrasound sensor, a plurality of ultrasound signals towards a test component comprising a defect and receiving the plurality of ultrasound signals reflected by the test component;

extract a plurality of features comprising time-frequency and statistical features from each of the plurality of received ultrasound signals;

determine type of the defect in the test component using a pre-trained classifier based on the plurality of features, wherein training of the pre-trained classifier comprises:

performing ultrasound test on a component without defect and a plurality of components with known defects, wherein the ultrasound test comprises transmitting a plurality of ultrasound signals to the component and recording the plurality of ultrasound signals reflected by the component;

extracting a plurality of features from the results of the ultrasound test;

correlating the plurality of features with the known defects of the plurality of components; and training the classifier using the plurality of features and corresponding defects;

determine a location of the defect comprised in the test component based on time of flight analysis of the plurality of ultrasound signals, wherein the time of flight of the ultrasound signal is time taken by the ultrasound signal to travel a certain distance through the test component, wherein the location of the defect is determined by minimizing an objective function $J=\Sigma_{j-1}{}^{N}f(j)^2$, wherein $$f(j) = \left(\frac{L_{S_T-D}}{V} + \frac{L_{D-S_j}}{V}\right) - \frac{L_{S_T-S_j}}{V} - \Delta t_{T-j} = 0,$$

wherein $L_{S_T-D}$ is distance between transmitter of the ultrasound sensor and the defect which is calculated as $\sqrt{x_D{}^2+y_D{}^2}$ wherein $(x_D, y_D)$ is the location of the defect, V is velocity of an ultrasound signal among the plurality of ultrasound signals, $L_{D-S_j}$ is distance between the defect and a receiver (j) among one or more receivers of the ultrasound sensor which is calculated as $\sqrt{(x_D-x_j)^2+(y_D-y_j)^2}$ wherein $(x_j, y_j)$ is location of the receiver (j), $L_{S_T-S_j}$ is distance between the transmitter and the receiver (j) which is calculated as $\sqrt{x_j{}^2+y^2}$, and $\Delta t_{T-j}$ is difference in time of flight of the ultrasound signal travelled via a direct path and an indirect path from the transmitter to the receiver;

scan, via the pulse echo ultrasound sensor, the location of the defect in the test component using a pulse echo ultrasound signal to determine depth of the defect;

scan, via the thermal camera, the location of the defect in the test component to estimate a dimension of the defect; and predict residual life of the test component using a pre-trained machine learning model based on the type of the defect, the location of the defect, the depth of the defect and the dimension of the defect, wherein training of the pre-trained machine learning model comprises:

obtaining residual properties of a plurality of components with known defects, wherein the residual properties comprise stiffness and load bearing capacity;

determining residual life of each of the plurality of components using a material degradation mechanism and a computational method based on the defect in the component, one or more predefined loading conditions, and material properties of the component; and training a machine learning model to generate the pre-trained machine learning model using the residual life of the plurality of components, features of defects in the plurality of components for the one or more predefined loading conditions and the material properties of the plurality of components, wherein the features of defects comprise type of the defect, location of the defect, depth of the defect and dimension of the defect.

4. The system of claim 3, wherein the plurality of features comprises box-pierce statistic of Discrete Wavelet Transform (DWT), mean of windowed box-pierce statistic of DWT, Hjorth complexity time-domain and standard deviation of windowed box-pierce stat of DWT, resonance peak locations, amplitude of resonance peaks, width of resonance peaks and adjacent resonance peak to peak distance, wherein the pre-trained classifier is ensemble adaptive boost classifier.

5. One or more non-transitory machine-readable information storage mediums comprising one or more instructions which when executed by one or more hardware processors cause:

transmitting, via an ultrasound sensor, a plurality of ultrasound signals towards a test component comprising a defect, and receiving the plurality of ultrasound signals reflected by the test component;

extracting a plurality of features comprising time-frequency and statistical features from each of the plurality of received ultrasound signals;

determining type of the defect in the test component using a pre-trained classifier based on the plurality of features, wherein training of the pre-trained classifier comprises:

performing ultrasound test on a component without defect and a plurality of components with known defects, wherein the ultrasound test comprises transmitting a plurality of ultrasound signals to the component and recording the plurality of ultrasound signals reflected by the component;

extracting a plurality of features from the results of the ultrasound test;

correlating the plurality of features with the known defects of the plurality of components; and training the classifier using the plurality of features and corresponding defects;

determining a location of the defect comprised in the test component based on time of flight analysis of the plurality of ultrasound signals, wherein the time of flight of the ultrasound signal is time taken by the ultrasound signal to travel a certain distance through the test component, wherein the location of the defect is determined by minimizing an objective function $J=\Sigma_{j-1}{}^{N}f(j)^2$, wherein $$f(j) = \left(\frac{L_{S_T-D}}{V} + \frac{L_{D-S_j}}{V}\right) - \frac{L_{S_T-S_j}}{V} - \Delta t_{T-j} = 0,$$

wherein $L_{S_T-D}$ is distance between transmitter of the ultrasound sensor and the defect which is calculated as $\sqrt{x_D{}^2+y_D{}^2}$ wherein $(x_D, y_D)$ is the location of the defect, V is velocity of an ultrasound signal among the plurality of ultrasound signals, $L_{D-S_j}$ is distance between the defect and a receiver (j) among one or more receivers of the ultrasound sensor which is calculated as $\sqrt{(x_D-x_j)^2+(y_D-y_j)^2}$ wherein $(x_j, y_j)$ is location of the receiver (j), $L_{S_T-S_j}$ is distance between the transmitter and the receiver (j) which is calculated as $\sqrt{x_j{}^2+y_j{}^2}$, and $\Delta t_{T-j}$ is difference in time of flight of the ultrasound signal travelled via a direct path and an indirect path from the transmitter to the receiver;

scanning, via a pulse echo ultrasound sensor, the location of the defect in the test component using a pulse echo ultrasound signal to determine depth of the defect;

scanning, via a thermal camera, the location of the defect in the test component to estimate a dimension of the defect; and predicting residual life of the test component using a pre-trained machine learning model based on the type of the defect, the location of the defect, the depth of the defect and the dimension of the defect, wherein training of the pre-trained machine learning model comprises:

obtaining residual properties of a plurality of components with known defects, wherein the residual properties comprise stiffness and load bearing capacity;

determining residual life of each of the plurality of components using a material degradation mechanism and a computational method based on the defect in the component, one or more predefined loading conditions, and material properties of the component; and training a machine learning model to generate the pre-trained machine learning model using the residual life of the plurality of components, features of defects in the plurality of components for the one or more predefined loading conditions and the material properties of the plurality of components, wherein the features of defects comprise type of the defect, location of the defect, depth of the defect and dimension of the defect.

6. The one or more non-transitory machine-readable information storage mediums of claim 5, wherein the plurality of features comprises box-pierce statistic of Discrete Wavelet Transform (DWT), mean of windowed box-pierce statistic of DWT, Hjorth complexity time-domain and standard deviation of windowed box-pierce stat of DWT, resonance peak locations, amplitude of resonance peaks, width of resonance peaks and adjacent resonance peak to peak distance, wherein the pre-trained classifier is ensemble adaptive boost classifier.

* * * * *